United States Patent [19]

Machnee et al.

[11] 4,446,801
[45] May 8, 1984

[54] AIR SEEDING BOOT

[75] Inventors: Cecil Machnee, Yorkton; Fred N. Butuk, Insinger, both of Canada

[73] Assignee: Morris Rod Weeder Co., Ltd., Saskatchewan, Canada

[21] Appl. No.: 398,449

[22] Filed: Jul. 14, 1982

[51] Int. Cl.$^3$ .............................................. A01C 5/00
[52] U.S. Cl. ................................................... 111/86
[58] Field of Search ....................... 111/7, 73, 84–86, 111/80

[56] References Cited

U.S. PATENT DOCUMENTS 4,296,695  10/1981  Quanbeck .......................... 111/34

FOREIGN PATENT DOCUMENTS

| 95076 | 11/1923 | Austria | 111/7 |
| 236091 | 12/1923 | Canada | 111/85 |
| 636736 | 2/1962 | Canada | 111/86 |
| 714318 | 7/1965 | Canada | 111/86 |
| 840146 | 7/1970 | Canada | 111/34 |
| 1081543 | 8/1980 | Canada | 111/86 |
| 1091101 | of 1981 | Canada | . |
| 1106239 | 12/1981 | Canada | 111/86 |
| 1153253 | 9/1983 | Canada | 111/86 |

Primary Examiner—James R. Feyrer
Attorney, Agent, or Firm—Cushman, Darby & Cushman

[57] ABSTRACT

A seeding boot for use with a cultivator shank and utilized for delivering particulate material such as seed, fertilizer, chemicals or the like to soil prepared by a soil working tool comprises a soil deflector which defines a surface for deflecting soil over the seeds deposited on the prepared soil, and thereafter allows the soil to cover the seeds, and a diffusing member matingly engageable with the soil deflecting member for diffusing the seeds or the like into substantially parallel rows and includes a downstream portion which abuts against the inner surface of the soil deflecting member and an upper surface portion separated from the lower surface portion by a predetermined dimension so that together with the soil deflecting member will define an interior cavity through which the particulate matter will be directed, a portion of the upper surface being biased so as to receive various sizes of seed conduits and to increase the versatility of use of the seeding boot.

19 Claims, 4 Drawing Figures

AIR SEEDING BOOT

BACKGROUND AND SUMMARY OF THE INVENTION

The present invention generally relates to farm implements which entrain particulate material such as seed, fertilizer, chemicals, or the like in a moving fluid, such as air, and deposits such particles onto soil prepared by a soil working tool. More particularly, the present invention relates to that portion of the farming implement which deposits the particulate material onto the soil.

The farming implement to which the present invention relates is conventionally referred to in the art as an "air seeder" (see, U.S. Pat. No. 4,296,695, the disclosure of which is incorporated fully herein by reference). Also, the particular portion of the air seeder to which the present invention specifically relates is known in the relevant art as a "seeding boot". However, seeding boots can be utilized not only for depositing seeds but also other particulate matter such as fertilizer and/or chemicals. Thus, although reference will be made herein to seeds, the reader will appreciate that other particulate matter normally utilized in farming operations is also contemplated.

Seeding boots deposit the seed onto the soil which has been prepared by a soil working tool normally disposed in advance of the seeding boot. Seeding boots are also conventionally utilized with a cultivator sweep which allows the soil moved by the soil working tool by virtue of its advance through the soil to cover the deposited seeds.

The seeding boot according to the present invention is particularly advantageous since it is adaptable for operative connection to a variety of conventional air seeders without modification to either the air seeder or the present novel seeding boot. Accordingly, the seeding boot according to the present invention is highly versatile in practice.

Seeding boots are not new. Indeed, the art is replete with various contrivances utilized to deposit seeds behind a cultivator sweep or soil working tool as evidenced by Canadian Pat. Nos. 636,735; 714,318; 840,146; 1,081,543; 1,091,101 and 1,106,239.

For example, Canadian Pat. No. 636,735 discloses a device installed so as to permit impingement of the air-delivered seeds and which includes a plurality of small apertures through which the seeds will pass so that the seeds are selectively broadcast. Canadian Pat. No. 714,318 discloses that a V-shaped wedge may be provided in a stream of air-delivered seeds to divert them into substantially two rows. Canadian Pat. No. 840,146 discloses that attachment bolts for cultivators can be utilized to broadcast seeds by virtue of the seeds impinging thereon while Canadian Pat. No. 1,081,543 discloses a rather complex baffle system for broadcasting air-delivered seeds. V-shaped members are also disclosed in Canadian Pat. Nos. 1,091,101 and 1,106,239. However, in the former, the V-shape of the member is utilized to distribute the seeds into two rows, while the later utilizes the V-shape of the member in an inverted manner so that the seeds will be deposited below the member in a single row and the fertilizer will be deposited onto the apex of the member and therefore migrate to either side of the seed row.

Such prior art seeding boots, of course, function in accordance with their intended purpose. However, most prior art seeding boots are expensive to manufacture as they require cutting, shaping and welding processes during the manufacturing process. Another problem associated with some prior art devices is that at least one bolt which secures the sweep and seeding boot to the shank of the farming implement passes through the hollow section of the seeding boot. After a period of sustained use, the hollow section may collapse slightly leaving the bolt relatively loose fitting and thereby promoting wear or damage to the shank, sweep or seed boot to the extent of even encouraging disassembly.

The present invention, however, is a distinct improvement over the prior art contrivances in that it solves at least three major problems encountered in the art. First, the boot according to the present invention can be manufactured easily and economically in that no welding or casting is required. Secondly, the seeding boot of the present invention is easy to install on cultivator shanks thereby increasing its versatility of use. Thirdly, the bolts which secure the seeding boot according to the present invention to the cultivator shanks never pass completely through the hollow section thereof and, therefore, the boot can be tightened with a high degree of torque without fear of collapsing the seeding boot so as to adequately secure it to the cultivator shank.

The versatility of the present invention enables it to be readily adaptable so as to fit many styles and sizes of cultivator shanks and sweeps presently in use. Preferably, the seeding boot according to the present invention is manufactued of a sturdy material such as steel or the like yet portions thereof can be made of a resilient material such as durable plastic, for example, which can withstand damage such as bending or cracking.

The outlet orifices of the present invention which discharge the particulate matter onto the soil prepared by the cultivator are large and are inclined rearwardly so as to prevent blockage by soil. The outlet orifices are disposed so that the particulate material is dispensed onto the soil prepared by the cultivator to form two rows which are substantially parallel to one another and are separated by a sparsely populated space. The two-row feature according to the present invention is important so that plants (e.g. if seeds are used) utilize the soil and fertilizer to a maximum extent.

These and other objects and advantages according to the present invention will become more clear after careful consideration is given to the detailed description of the preferred exemplary embodiment which follows.

DETAILED DESCRIPTION OF THE PREFERRED EXEMPLARY EMBODIMENT

Figure 1:
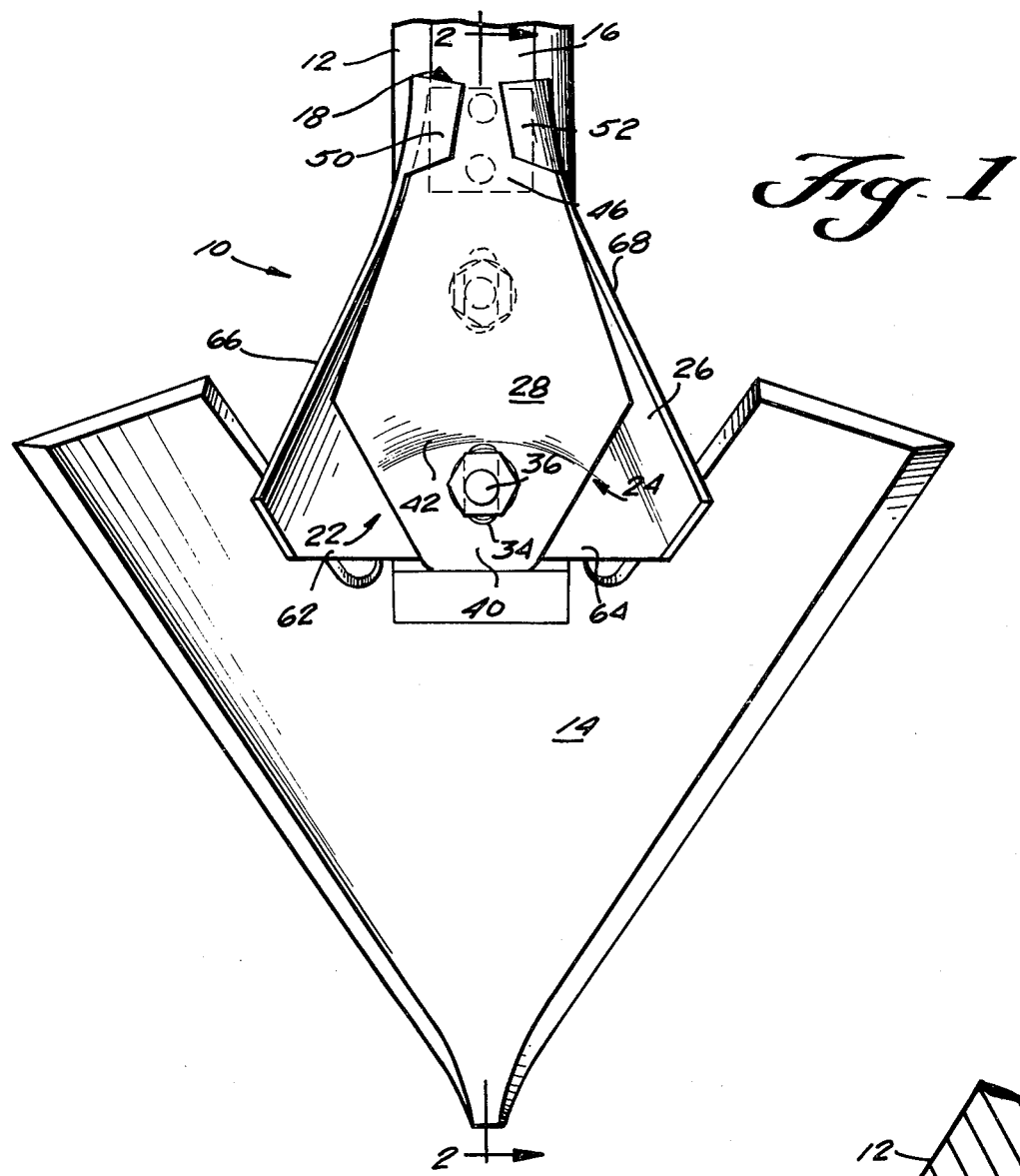
FIG. 1 is a bottom view of an embodiment of the seeding boot according to the present invention depicted in operative engagement with a conventional cultivator shank.
Figure 2:
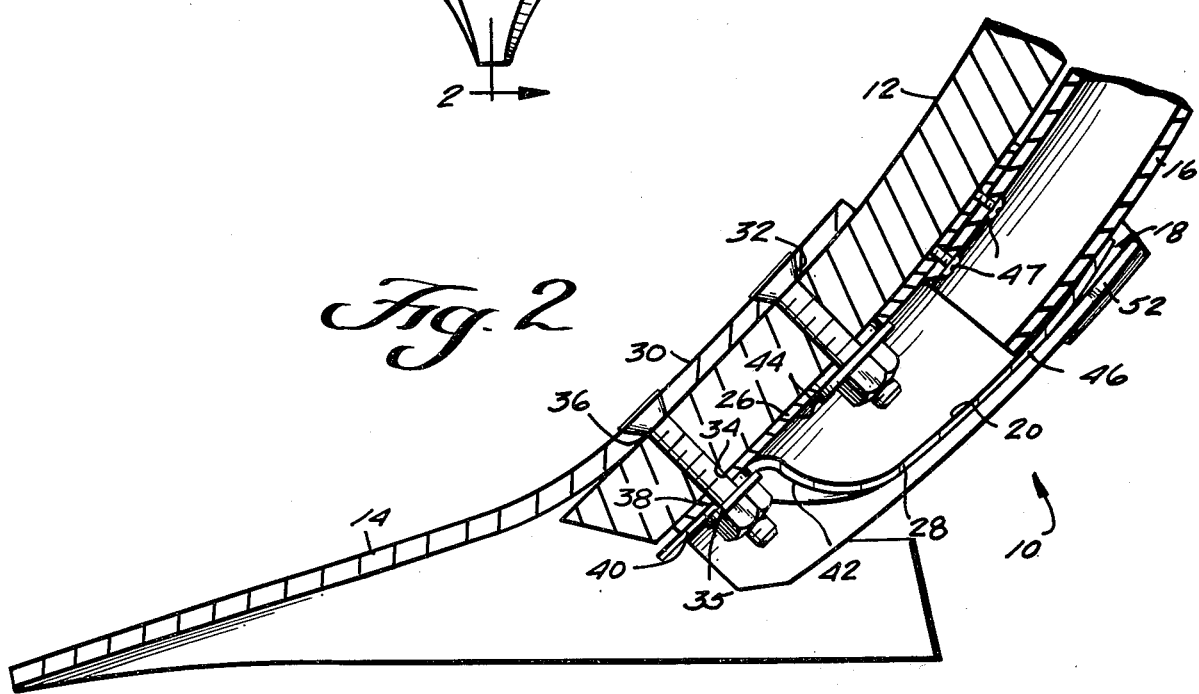
FIG. 2 is a cross-sectional elevational view of the seeding boot according to the present invention taken along line 2—2 in FIG. 1.

Referring to FIG. 1, it is seen that the seeding boot 10 according to the present invention is adapted for being securely attached to a cultivator shank 12 and rearwardly disposed relative to a soil preparing tool or shovel 14. A conduit 16 is provided in association with shank 12 so as to direct particulate material, such as, seeds or the like, from a conventional source of particulate material (e.g. seed, fertilizer, chemicals or the like) and from a conventional means for entraining predetermined amounts of such material in a moving fluid (all as schematically depicted in FIG. 2) to the inlet end 18 seed boot 10. Thereafter, the seeds will enter a hollow cavity (shown as 20 in FIG. 2) defined by the seed boot 10 according to the present invention and will be discharged or broadcast through discharge openings 22, 24 to be deposited on the soil prepared by shovel 14.

Seed boot 10 according to the present invention generally comprises two major components, e.g., soil deflecting member 26 and diffusing member 28. Soil deflecting member 26 and diffusing member 28 are matingly engageable with one another so as to define a hollow cavity 20 therebetween (see FIG. 2).

As shown in FIG. 1, soil deflecting member 26 is generally triangularly shaped so that as shovel 14 advances through the soil, the displaced soil will be deflected over the upper surface 30 (see FIG. 2) and, thereafter, will fall over the trailing edge so as to cover the seeds deposited onto the soil. Soil deflector member 26 is secured to the cultivator shank 12 by means of a bolt 32 which also secures shovel 14 to shank 12. The metal surfaces of deflector member 26 and shovel 14 can, therefore, be secured together with a high degree of torque without fear of damaging or collapsing any parts thereof since only solid surfaces are abutting one another. Such a high degree of torque is important to maintain shovel 14 in a proper operating orientation.

Diffusing member 28 is matingly engageable with soil deflector 26 and defines an opening 34 in the leading edge portion thereof so that a bolt 36 can securely fasten shovel 14, shank 12, the downstream portion 38 of soil deflector 26, and diffusing member 28. Once again, only solid surfaces abut one another and, therefore, a high degree of torque can be effected without fear of damaging or collapsing the cavity 20 of seed boot 10.

Diffusing member 28 generally comprises a downstream surface portion 40 which abuts soil deflector 26 and defines the opening 34 through which bolt 36 is secured. A transition section 42 is bent at or near right angles away from the interior surface 44 of soil deflector 26 and the upstream surface portion 46 of diffusing member 28 extends from the transition section 42 to the inlet end 18. In such a manner, the upstream surface portion 46 and the interior surface 44 of soil deflector 26 together define cavity 20 through which the seeds or other particulate matter will be distributed.

Each of the upstream portion 46 and downstream portion 40 generally includes leading and trailing edges. Such edges are not well defined however since upstream, downstream and transition portions are all integral with one another. Thus, as used herein, the "edges" of upstream and downstream portions 46, 40, respectively, is that area where the transition occurs between transition portion 42 and each of upstream and downstream portions 46, 40, respectively. In the embodiment depicted in FIGS. 1-4, upstream portion 46 is separated from downstream portion 40 by transition portion 42 by virtue of transition portion 42 connecting the leading edge of upstream portion 46 and the trailing edge of downstream portion 40. Other configurations are envisioned, e.g. transition portion 42 connecting the leading edges of both upstream and downstream 46, 40, respectively.

Additionally, upturned portion 42 is preferably arcuate or defines impinging surfaces upon which seeds will impinge to be directed through discharge openings 22, 24 in a rearwardly divergent manner. Thus, the seeds or other particulate matter which are deposited onto the soil are deposited in substantially two parallel rows.

As shown in FIG. 1, discharge openings 22, 24 defined by diffusing member 28 are preferably large and are divergently disposed relative to one another in the direction of inlet end 18. This rearwardly divergent shape of discharge openings 22, 24 coupled with their relatively large open area renders them substantially immune to being blocked by soil when in use.

The upstream portion 46 of diffusing member 28 is retained under tab members 50, 52 of soil deflector 26 so as to restrain its movement away from conduit 16. Referring specifically to FIG. 2, it is seen that diffusing member 28 in the area of upstream portion 46 is curved thereby biasing upstream portion 46 so as to accommodate various sizes of conduits 16 and to ensure secure attachment of inlet end 18 thereto. Thus, when it is desired to install the seed boot 10 according to the present invention, upstream portion 46 of diffusing member 28 must be resiliently urged towards tab members 50, 52 so as to enlarge inlet end 18 for mating engagement with conduit 16. Thereafter, release of upstream portion 46 will cause diffusing member 28 to securely engage conduit 16 due to its inherent biasing. Conduit 16 may also be secured to soil deflecting member 26 via rivets or screws 47.

Figure 3:
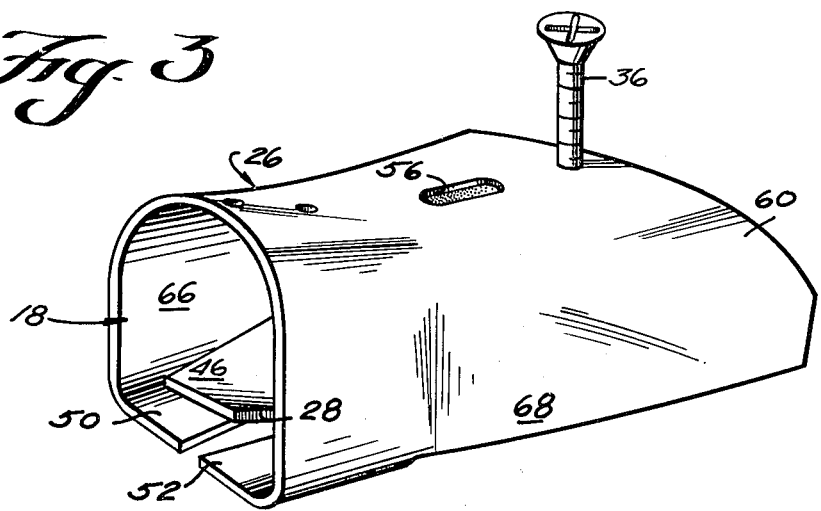
FIG. 3 is a perspective view showing the inlet end of the seeding boot according to the present invention.
Figure 4:
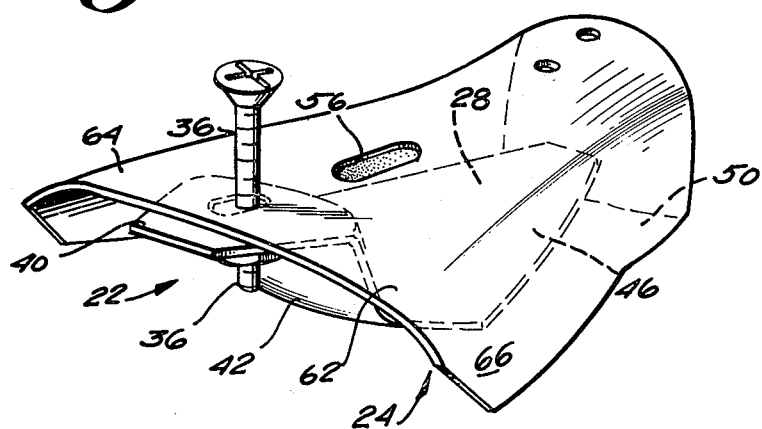
FIG. 4 is a perspective view showing the discharge end of the seeding boot according to the present invention.

Seed boot 10 of the present invention can be viewed in a disassembled condition from shank 12 by referring to FIGS. 3 and 4. As shown more clearly therein, soil deflecting member 26 includes a top surface 60 which is adapted to being abutted against shank 12 (not shown in FIGS. 3 and 4 for clarity). Moreover, top surface 60 is generally triangularly shaped so as to form wings 62, 64 near discharge openings 22, 24. Integral with top surface 60 are opposing side walls 66, 68 which are divergently disposed relative to one another between inlet end 18 and discharge openings 22, 24. Thus, when diffusing member 28 is matingly placed with soil deflecting member 26, cavity 20 will substantially be defined by diffusing member 28, walls 66, 68 and interior surface 44.

As previously noted outlet openings 22, 24 are divergently oriented with respect to one another. The air-delivered seeds will therefore be directed into inlet end 18 and, due to the deflecting surfaces of the transition portion 42, will be deflected into divergent paths under the wings 62, 64 of soil deflector 26. Wings 62, 64 will restrain the soil displaced by the shovel as it moves through the soil in order to permit the seeds or the like to be deposited onto the prepared soil and, thereafter, the displaced soil will fall over the trailing edge of wings 62, 64 so as to cover the seeds.

As noted above, bolt 32 is utilized to secure soil deflector 26 to cultivator shank 12. While bolt 32 does not pass completely through cavity 20 and, therefore, fear of damaging the seed boot 10 avoided, bolt 32 will, preferably, extend a predetermined dimension into the cavity 20. Bolt 32 is also axially aligned with seed conduit 16 so that when seeds enter through inlet end 18 they will be initially deflected by virtue of that portion of bolt 32 extending into the cavity 20. In this manner, more complete broadcasting or diffusion of the seeds will occur.

To assemble the seeding boot according to the present invention onto a cultivator shank, the soil deflector 26 is first secured to shank 12 by means of bolt 32 as hereinbefore described. While the bolt 32 is being tightened, opening 34 of the soil deflector is aligned with the bolt 36. Preferably, soil deflector 26 is provided with at least one elongated opening 56 (see FIGS. 3 and 4) so that seed boot 10 can be received by several styles and sizes of cultivator shanks 12. Additionally, openings 34 may also be elongated so as to permit the same function.

Subsequent to the soil deflector 26 being adequately secured to the cultivator shank by bolt 32, diffusing member 28 is installed onto the soil deflector 26 by inserting the upstream portion 46 under opposing tab member 50, 52. In such a manner, the opposing tabs serve to restrain the downstream portion 46 of diffusing member 28 as hereinbefore described. The downstream surface portion 40 of diffusing member 28 defines opening 35 which, when properly installed, communicates with opening 34 of soil deflector 26. Opening 35 may be elongated or in the shape of a slot to allow diffusing member 28 to be adjusted in a very near mating manner against said deflector 26 so as to mate more precisely than would otherwise be possible. Through openings 34, 35, bolt 36 is installed and all parts are thereafter tightened against one another in an abutting manner so as to securely fasten the seed boot 10 according to the present invention to the cultivator shank. A high degree of torque can be placed on bolts 32, 36 without fear of damaging or callapsing cavity 20.

Thus, the present invention provides a novel and useful seed boot which alleviates many of the problems encountered in the prior art. Additionally, the seeding boot according to the present invention is highly versatile in that it is readily adaptable for use with various cultivator shanks now in use on conventional air seeding farm implements.

Thus, while the present invention has been herein described in what is presently conceived to be the most preferable embodiment thereof, it will be appreciated by those in the art that many modifications may be made hereof, which modifications shall be accorded the broadest interpretation of the appended claims so as to encompass all equivalent structures, assemblies and/or devices.

What is claimed is:

1. An air seeding boot used to deliver material such as seed, fertilizer, or chemicals to be deposited onto the soil prepared by a soil working tool, the boot being adapted to mount on a mounting shank together with a soil working tool and to be secured to the shank with at least one bolt also used to mount the soil working tool thereto in such a manner that the bolts used do not fasten across a part of the boot which is easily compressed, said boot comprising:
   a front part for the purpose of deflecting the soil moved by the soil working tool away from the area where dispensed material will be deposited;
   a back part which diffuses and separates dispensed material into two portions and allows the material to be deposited on the soil prepared by the soil working tool in two rows generally separated and generally equal; and
   the two said parts mating with one another to form a hollow body having an opening on the top portion for receiving a material delivery conduit, and having two generally equal openings on the bottom portion of the hollow body, the openings being of generally oval shape inclined backward and upward from the lower portion of the hollow body the two said parts being directly and rigidly bolt-connectable to said shank by said working tool mounting bolt which bolt avoids passage through said hollow body.

2. An air seeding boot as in claim 1 in which the material delivery conduit is resiliently received within the top end of the boot.

3. A boot for delivery particulate material such as seed, fertilizer, chemicals, or the like entrained in a moving fluid, such as air, to be deposited onto the soil prepared by a soil working tool and adapted for operative connection to a shank and to a conduit for directing said entrained material from a source thereof, said boot comprising:
   soil deflecting means defining soil deflecting surfaces for deflecting soil displaced by said soil working tool and defining an interior space, said soil deflecting means including inlet means defining an inlet opening adapted for operative connection to said conduit and for accepting said entrained particles into said interior space therefrom; and
   diffusing means matingly engageable with said soil deflecting means for diffusing said entrained material and for covering a predetermined portion of said interior space so as to define with said soil deflecting means a hollow cavity, said diffusing means including means defining first and second outlet openings in communication with said chamber so that said entrained material will exit said chamber in divergent paths through said first and second openings so as to be deposited onto said soil prepared by said soil working tool in substantially parallel rows each of said soil deflecting means and said diffusing means including at least one bolt mounting aperture located for common bolted connection therethrough on one side of said shank and with the soil working tool on the other side of said shank without applying compressive forces to the portions of the deflecting means and diffusing means defining said hollow cavity.

4. A boot as in claim 3 wherein said soil deflecting surfaces comprise a deflecting member including a top surface portion having inlet and discharge ends, and right and left opposing side portions integral with said top surface portion and dependently projecting therefrom, said side portions being divergently disposed relative to one another between said inlet and discharge ends thereby defining an interior space therebetween.

5. A boot as in claim 3 wherein said diffusing means includes biasing means in the area of said inlet means for inwardly biasing said diffusing means so as to effect clamping engagement with said conduit.

6. A boot as in claim 3, 4 or 5 wherein each of said first and second outlet openings are divergently disposed relative to one another in the direction of said inlet opening.

7. A boot as in claim 3 or 4 wherein said diffusing means includes:
   means defining a first surface abutting a portion of said soil deflecting means;
   means defining a second surface for covering a predetermined portion of said interior area thereby defining said chamber; and entrained material deflecting means defining an entrained material deflecting surface rigidly disposed between and vertically separating said first and second surface defining means by a predetermined dimension for deflecting said entrained material into said divergent paths.

8. A boot as in claim 7 wherein each of said first and second surface defining means includes leading and trailing edge portions, said entrained material deflecting means being rigidly disposed between said trailing edge portion of said first surface defining means and said leading edge portion of said second surface defining means.

9. A boot as in claim 8 wherein said second surface defining means includes biasing means for inwardly biasing said second surface defining means so that clamping engagement can be effected with said conduit.

10. A boot as in claim 5 further comprising securing means for rigidly securing said diffusing means to said shank, and preliminary deflecting means upstream of said entrained material deflecting means for preliminarily deflecting said entrained material.

11. A boot as in claim 10 wherein said securing means and preliminary deflecting means are integral with one another and comprise threadably engageable bolt means for securing said diffusing means to said shank, said bolt means extending a predetermined dimension into said cavity so as to preliminarily deflect said entrained material.

12. A boot as in claim 11 wherein said securing and preliminary deflecting means is generally centrally disposed in said cavity.

13. An air seeding boot adapted for physical attachment to a soil working tool mounting shank and to a conduit source of particulate agricultural materials, said boot comprising:
   a one-piece first member at least partially closed upon itself so as to partially define a hollow particulate distribution chamber as a generally concave-shaped portion thereof;
   said one-piece first member having at least one aperture therethrough for direct bolted connection to said mounting shank; and
   a one-piece second member having at least one aperture therein for direct bolted connection to at least one of said mounting shaft and said first member and having a portion angularly bent-away from the aperture therein and which bent-away portion cooperates with said generally concave-shaped portion of the first member to define said hollow particulate distribution chamber
   said direct bolted connection apertures being located to avoid bolt passage through said hollow particulate distribution chamber while simultaneously permitting direct bolted connection by said bolt of a soil working tool to said mounting shank and thus transferring substantially the same compression mounting forces to said first and second members at the location of said bolt connection apertures thereby avoiding any tendency to compress said chamber and/or to loosen said soil working tool.

14. An air seeding boot as in claim 13 wherein each of said first and second members diverge from a top end to a substantially wider bottom end, mating apertures in said first and second members being disposed proximate the wider ends thereof such that, when bolt-connected together, they define a particulate divider which results in a two-row delivery of particulates from the boot.

15. In combination with a device of the type for entraining a particulate material, such as seed, fertilizer, chemicals, or the like and for depositing said material onto the soil as said device is advanced across the surface of said soil, and including a source of said particulate material, means for entraining predetermined amounts of said material in a moving fluid, shank means supporting a soil working tool and conduit means for directing said entrained material from said material source to said soil rearwardly of said soil working tool, the improvement comprising a boot rigidly attached to said shank for delivering said material in at least two substantially parallel rows onto said soil prepared by said soil working tool as it advances through said soil, said boot comprising:
   soil deflecting means defining surfaces for deflecting soil displaced by said soil working tool and defining an interior space, said soil deflecting means including inlet means defining an inlet opening adapted for operative connection to said conduit and for accepting said entrained particles into said interior space therefrom; and
   diffusing means matingly engageable with said soil deflecting means for diffusing said entrained material and for covering a predetermined portion of said interior space so as to define with said soil deflecting means a hollow cavity, said diffusing means including means defining first and second outlet openings in communication with said chamber so that said entrained material will exit said chamber in divergent paths through said first and second openings so as to be deposited onto said soil prepared by said soil working tool in substantially parallel rows
   said soil working tool, said soil deflection means and said diffusing means all being directly and rigidly bolt connected to said shank by at least one threaded bolt connection thus subjecting the bolt connected means and tool to substantially the same compressive forces at the bolted connection;
   said bolted connection being located to avoid passage through said hollow cavity and thus avoid any tendency to compress said hollow cavity and/or to loosen said soil working tool.

16. An air seeding boot used to deliver material such as seed, fertilizer, or chemicals to be deposited onto the soil prepared by a soil working tool, the boot being adapted to mount on a mounting shank together with a soil working tool and to be secured to the shank with at least one bolt also used to mount the soil working tool thereto in such a manner that the bolts used do not fasten across a part of the boot which is easily compressed, said boot comprising:
   a front part for the purpose of deflecting the soil moved by the soil working tool away from the area where dispensed material will be deposited;
   a back part which diffuses and separates dispensed material into two portions and allows the material to be deposited on the soil prepared by the soil working tool in two rows generally separated and generally equal;
   the two said parts mating with one another to form a hollow body having an opening on the top portion for receiving a material delivery conduit, and having two generally equal openings on the bottom portion of the hollow body, the openings being of generally oval shape inclined backward and upward from the lower portion of the hollow body;

the mating portions of said front and back including portions at the bottom end of the boot parts which have holes therein to receive one of the bolts which also secures the soil working tool to the shank; and the top end of the boot parts having a mating tang and tab means which interlock to secure the top part of the boot parts together.

17. An air seeding boot as described in claim 16 in which a second boot used to attach the soil working tool to the shank also secures the front upper portion of said front part of the boot, this bolt being enclosed when the back portion of the boot is installed by means of the interlocking tab and tang, a lower bolt securing the bottom portions of the two boot parts, the second bolt acting to secure the upper portion of the front deflector with such connection also acting to diffuse dispensed material.

18. An air seeding boot as described in claim 17 in which at least one bolt hole in the front soil deflector part of the boot is in the form of a slot so the bolt will be accepted by several types and sizes of shanks.

19. An air seeding boot as described in claim 18 in which the back part has a bolt receiving hole in its lower portion in the shape of a slot so that the back part may be adjusted with respect to the front soil deflecting part of the boot in such a manner to obtain a optimum fit between the two formed mating parts of the hollow boot.

* * * * *